United States Patent
Srigley et al.

(10) Patent No.: US 12,289,363 B2
(45) Date of Patent: Apr. 29, 2025

(54) METHOD FOR OPERATING ACTIVE-ACTIVE MESSAGE QUEUEING HIGH AVAILABILITY CLUSTERS

(71) Applicant: Ameriprise Financial, Inc., Minneapolis, MN (US)

(72) Inventors: Erik Srigley, St. Paul, MN (US); Mary Egan, Monticello, MN (US); Gail Johnson, Vadnais Heights, MN (US); Ralph Currier, Buffalo, MN (US); Avanish Kumar, Hopkins, MN (US)

(73) Assignee: Ameriprise Financial, Inc., Minneapolis, MN (US)

( * ) Notice: Subject to any disclaimer, the term of this patent is extended or adjusted under 35 U.S.C. 154(b) by 174 days.

(21) Appl. No.: 18/207,068

(22) Filed: Jun. 7, 2023

(65) Prior Publication Data

US 2024/0414224 A1    Dec. 12, 2024

(51) Int. Cl.
*H04L 67/1004*    (2022.01)
(52) U.S. Cl.
CPC ................ *H04L 67/1004* (2013.01)
(58) Field of Classification Search
CPC .................................................. H04L 67/1004
See application file for complete search history.

(56) References Cited

U.S. PATENT DOCUMENTS

| | | | | |
|---|---|---|---|---|
| 7,802,010 B1* | 9/2010 | Oehrke | ............... | H04L 51/23 709/227 |
| 2007/0143373 A1* | 6/2007 | D'Souza | ............... | G06F 16/214 |
| 2007/0174660 A1* | 7/2007 | Peddada | ............. | H04L 67/1027 714/4.1 |
| 2008/0016206 A1* | 1/2008 | Ma | ..................... | H04L 43/12 709/224 |
| 2013/0191465 A1* | 7/2013 | Sundaram | ........... | H04L 43/0817 709/206 |
| 2013/0227091 A1* | 8/2013 | Tompkins | ............... | H04L 41/00 709/224 |
| 2014/0006578 A1* | 1/2014 | Kohn | .................. | H04L 67/1031 709/223 |
| 2015/0135001 A1* | 5/2015 | Harpaz | ................... | G06F 11/00 714/4.11 |
| 2015/0229775 A1* | 8/2015 | Kamboh | ................ | H04M 11/04 379/45 |
| 2016/0226963 A1* | 8/2016 | Forsberg | ................. | H04L 67/56 |
| 2016/0357778 A1* | 12/2016 | MacKenzie | ............. | G06F 13/36 |
| 2022/0214911 A1* | 7/2022 | Scarfutti | ............. | G06F 16/2379 |

* cited by examiner

*Primary Examiner* — Benjamin M Thieu
(74) *Attorney, Agent, or Firm* — SNELL & WILMER L.L.P.

(57) ABSTRACT

A method for managing high availability messaging queueing is disclosed herein. The method includes receiving, by a first messaging server of a plurality of messaging servers in a first messaging cluster, a first request from a client server, the first request including a plurality of messages to be processed, storing, by the first messaging server, the received plurality of messages, replicating, by the first messaging server, the plurality of messages to the remaining servers of the plurality of messaging servers in the first messaging cluster, and sending, by the first messaging server, a first response to the client server after replicating the plurality of messages to the remaining servers of the plurality of messaging servers.

13 Claims, 8 Drawing Sheets

METHOD FOR OPERATING ACTIVE-ACTIVE MESSAGE QUEUEING HIGH AVAILABILITY CLUSTERS

FIELD

The disclosure generally relates high availability systems, and more particularly, to active-active message queueing in high availability systems.

BACKGROUND

High availability systems typically utilize a system of primary and failover systems to help address the problem of servers being unavailable at certain times. However, a problem exists with failover systems in that the failover system often begins receiving the data after a failure of the primary system, resulting in some amount of data loss. Furthermore, the transition from the primary system to the failover system usually relies on configuration changes that are manually performed, which could be time-consuming and be prone to errors. The lost data may be sent again after the failover system is brought online, but such delays in receiving the lost data may be problematic for certain systems.

SUMMARY

A method for managing high availability messaging queueing is disclosed herein. The method includes receiving, by a first messaging server of a plurality of messaging servers in a first messaging cluster, a first request from a client server, the first request including a plurality of messages to be processed, storing, by the first messaging server, the received plurality of messages, replicating, by the first messaging server, the plurality of messages to the remaining servers of the plurality of messaging servers in the first messaging cluster, and sending, by the first messaging server, a first response to the client server after replicating the plurality of messages to the remaining servers of the plurality of messaging servers.

In various embodiments, the method further includes streaming, by the first messaging server, the plurality of messages to a second messaging cluster, the second messaging cluster including a second plurality of messaging servers. In various embodiments, the streaming the plurality of messages is performed after sending the first response. In various embodiments, the method further includes receiving, by the first messaging server, a status request from a global server load balancer and sending, by the first messaging server, a response to the global server load balancer indicating a status of the first messaging server.

In various embodiments, replicating the received data further includes sending, by the first messaging server, a second request to a second messaging server of the remaining servers, the second request including the plurality of messages, sending, by the first messaging server, a third request to a third messaging server of the remaining servers, the third request including the plurality of messages, and receiving, by the first messaging server, a second response from the second messaging server and a third response from the third messaging server.

In various embodiments, the storing the plurality of messages further comprises storing, by the first messaging server, the plurality of messages in a database and the replicating the plurality of messages further comprises replicating, by the first messaging server, the plurality of messages from the database to the remaining servers of the plurality of messaging servers. In various embodiments, the method further includes sending, by the first messaging server, a first message of the plurality of messages to be processed to an application cluster including a plurality of application servers configured to process the first message.

Also disclosed herein is a system for performing a method managing high availability message queueing. The system includes a first messaging cluster in a first data center, the first data center being located in a first geographic location, a second messaging cluster in a second data center, the second data center being located in a second geographic location, a client server being located in a third geographic location, a global server load balancer including a processor, and a memory operatively coupled to the processor. The memory includes instructions stored thereon that, in response to being executed by the processor, cause the processor to monitor a first status of the first messaging cluster in the first data center, monitor a second status of the second messaging cluster in the second data center, receive a first request from the client server, the first request being for a first destination to send data for processing, identify the first messaging cluster as the first destination based on the first status being available and the third geographic location, respond to the first request with a first connection information for the first messaging cluster, receive a second request from the client server, the second request being for a second destination to send the data for processing, identify the second messaging cluster as the second destination based on the first status being unavailable and the second status being available, and respond to the second request with a second connection information for the second messaging cluster.

In various embodiments, the instructions in response to being executed by the processor, further cause the processor to identify the first messaging cluster based on a first distance being less than a second distance, the first distance being between the first geographic location and the third geographic location and the second distance being between the second geographic location and the third geographic location. In various embodiments, the first messaging cluster includes a first plurality of messaging servers and the instructions in response to being executed by the processor, further cause the processor to monitor a status of each of the first plurality of messaging servers and identify a first server of the first plurality of messaging servers as the first destination.

In various embodiments, the first status is available in response to at least one of the first plurality of messaging servers being available. In various embodiments, the second messaging cluster includes a second plurality of messaging servers and the instructions in response to being executed by the processor, further cause the processor to monitor a status of each of the second plurality of messaging servers and identify a first server of the second plurality of messaging servers as the second destination.

In various embodiments, the second status is available in response to at least one of the second plurality of messaging servers being available. In various embodiments, the first messaging cluster is configured to receive the data for processing and replicate the data for processing to each of a first plurality of servers in the first messaging cluster. In various embodiments, the first messaging cluster is further configured to stream the data for processing to the second messaging cluster and the second messaging cluster is configured to replicate the data and store the data for processing by the second messaging cluster. In various embodiments, the identify the first messaging cluster as the first destination further includes identifying a first server of plurality of servers in the first messaging cluster as the first destination.

Also disclosed herein is a method of managing high availability message queueing. The method includes receiving, by a processor in a first messaging cluster, a first request to process a first data from a first server in a second messaging cluster, storing, by the processor, the first data in a persistent memory for processing, sending, by the processor, a second request to a standby server in the first messaging cluster to store the first data on the standby server, receiving, by the processor, a first response from the standby server indicating that the first data is stored, sending, by the processor, a second response to the first server in the second messaging cluster after receiving the first response, the second response indicating that the first data is replicated in the first messaging cluster, receiving, by the processor, a third request to process the first data in response to the second messaging cluster being offline, and processing, by the processor, the first data in response to the third request.

In various embodiments, the method further includes receiving, by the processor, a fourth request to process a second data from a client server and sending, by the processor, a third response to the client server indicating that the second data is stored. In various embodiments, the method further includes sending, by the processor, the second data to the standby server to be stored before sending the third response. In various embodiments, the method further includes sending, by the processor, the second data to the second messaging cluster to be stored on the second messaging cluster.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1A:
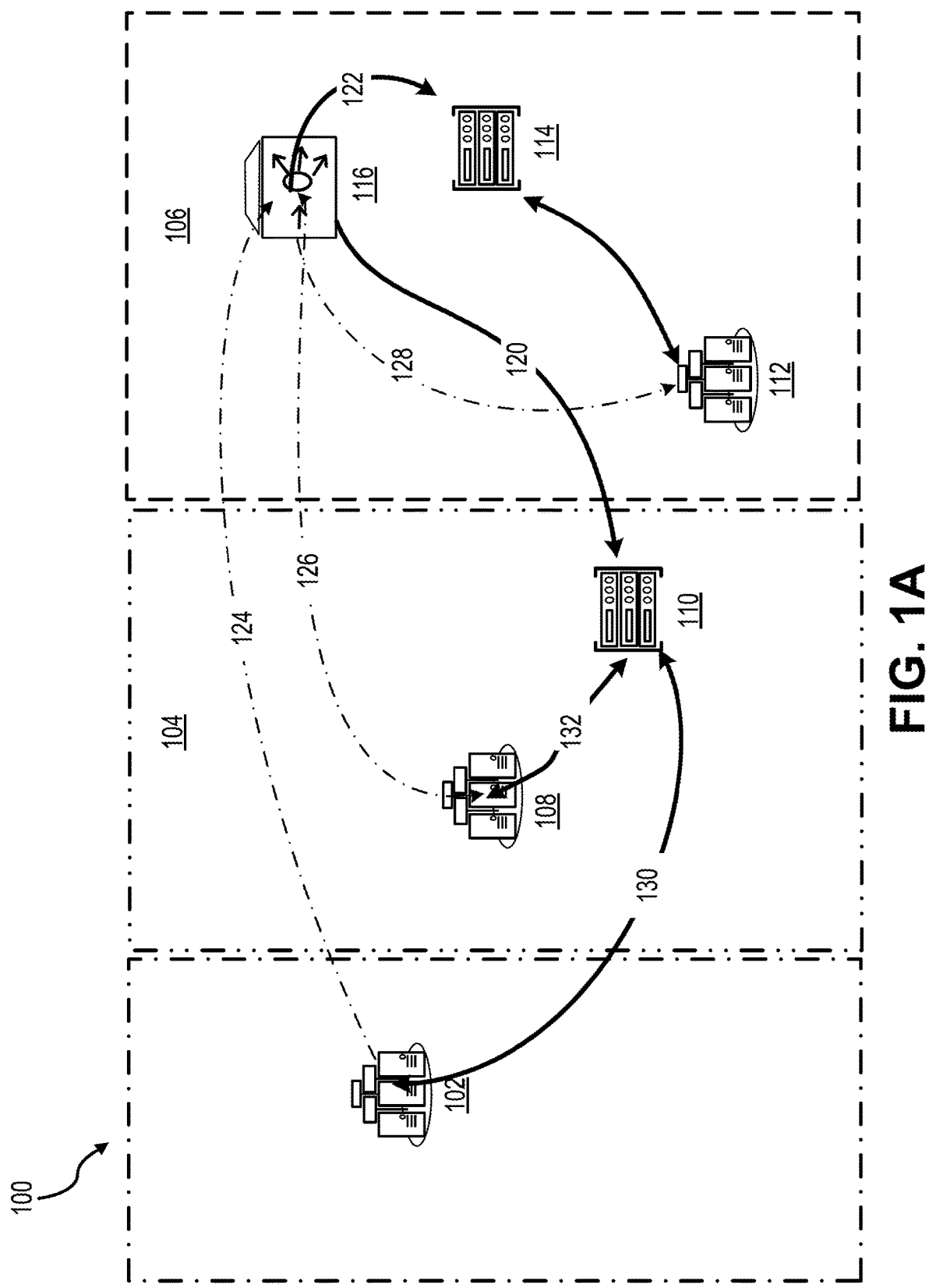
FIGS. 1A and 1B illustrate exemplary systems for managing high availability message queueing, in accordance with various embodiments.

Referring now to FIG. 1A, a system 100 is illustrated in accordance with various embodiments. System 100 may include a client server 102, a first data center 104, and a second data center 106. Client server 102 may be connected to first data center 104 and second data center 106 by a network such as a local area network (LAN), wide area network (WAN), or a virtual private network (VPN), among others. Client server 102 may communicate with first data center 104 and second data center 106 using TCP/IP or other suitable networking protocols. Server 102 may be a client system and may include a graphical user interface (GUI) or other user interface to generate digital messages and communicate those digital messages to first data center 104 and second data center 106. In various embodiments, client server 102 may provide an application programming interface (API) to receive requests to create, receive, and/or transmit digital messages from a client computer (e.g., a laptop, personal computer, tablet, etc.).

First data center 104 may include a first application server cluster 108 (including a plurality of application servers) and a first message queueing server, first MQ server 110. First data center 104 may be located in a first geographical region and may run an application on a first business backend. In various embodiments, the first application server cluster 108 may run a custom backend, an Amazon Web Services (AWS®) backend, or a Kyndryl backend, among others. First MQ server 110 is configured to receive the digital messages from client server 102 and forwards the digital messages to first application server cluster 108 for processing.

Second data center 106 may include a second application server cluster 112, including a plurality of application servers, a second message queueing server, second MQ server 114, and a global server load balancer (GSLB) 116. Second data center 106 is located in a second geographical region, that is different than the first geographical region, and runs the application on a second business backend. Placing first data center 104 and second data center 106 in different geographical regions provides improved service to clients in different geographical regions and data redundancy in case of failure of first data center 104 or second data center 106. In various embodiments, the second application server cluster 112 may run a custom backend, an Amazon Web Services (AWS®) backend, or a Kyndryl backend, among others. In various embodiments, second application server cluster 112 may run a different backend than first application server cluster 108. Second MQ server 114 is configured to receive the digital messages from client server 102 and forward the digital messages to second application server cluster 112 for processing. In various embodiments, first data center 104 may include a second GSLB that communicates and coordinates with GSLB 116. In various embodiments, GSLB 116 may be hosted in first data center 104 instead of second data center 106.

GSLB 116, also referred to as a global load balancer (GLB) or as a global traffic manager (GTM), continuously monitors the health and status of first MQ server 110 and second MQ server 114. GSLB 116 sends a first status message 120 to first MQ server 110 and determines whether first data center 104 is available based on a response to first status message 120. GSLB 116 identifies first data center 104 as available in response to receiving the response from first MQ server 110. GSLB 116 sends a second status message 122 to second MQ server 114 and determines whether second data center 106 is available based on a response to second status message 122. GSLB 116 identifies second data center 106 as available in response to receiving the response from second MQ server 114. In various embodiments, GSLB 116 may send first status message 120 and/or second status message 122 at regular intervals. In various embodiments, the regular interval may be about every 30 seconds to about every 5 minutes, and more specifically, about every minute. In various embodiments, GSLB 116 may execute a three-way TCP/IP handshake between GSLB 116, first MQ server 110, and second MQ server 114. GSLB 116 may monitor the status of first MQ server 110 and second MQ server 114 via the TCP/IP connection in assist in determining the status of first MQ server 110 and/or second MQ server 114.

Client server 102 sends a first domain name service (DNS) message 124 to GSLB 116 requesting a destination (e.g., first data center 104 or second data center 106) to send the digital messages for processing. GSLB 116 receives and processes first DNS message 124 to identify a suitable destination for client server 102. GSLB 116 identifies the destination based at least in part on the status of first data center 104 and second data center 106 as determined by the responses to first status message 120 and second status message 122. In various embodiments, the destination may be based on geographical locations of client server 102, first data center 104, and second data center 106. In various embodiments, the destination may be based on at least the backend running on first data center 104 and second data center 106 (e.g., custom, AWS®, Kyndryl™, etc.).

Additionally, GSLB 116 sends a second DNS request 126 to first application server cluster 108 and a third DNS request 128 to second application server cluster 112 to identify host names for the plurality of application servers running in first application server cluster 108 and second application server cluster 112, respectively. In various embodiments, GSLB 116 may send second DNS request 126 and/or third DNS request 128 in response to receiving first DNS request 124. In various embodiments, GSLB 116 may send second DNS request 126 and/or third DNS request 128 at regular intervals, similar to first status message 120 and second status message 122, and store the responses from first application server cluster 108 and/or second application server cluster 112. In various embodiments, GSLB 116 may further balance the load across the individual servers running in first application server cluster 108 and second application server cluster 112.

GSLB 116 replies to the first DNS request 124 with information for client server 102 to connect to one of the application servers in the first application server cluster 108 or the second application server cluster 112. The response may be in any suitable format. In various embodiments, the response may be in a JavaScript Object Notation (JSON) format. Below is an example JSON response to first DNS request:

```
{
    "channel": [
        {
            "name": "CHANNEL1",
            "clientConnection": {
                "connection": [
                    {
                        "host": "host1.example.com ",
                        "port": 2222
                    }
                ],
                "queueManager": "MANAGER1"
            },
            "transmissionSecurity":
            {
                "cipherSpecification": "TLS_RSA_WITH_AES_256_CBC_SHA256",
                "certificateLabel": "medme2",
                "certificatePeerName": "CN=RDQM*,O=Example Inc,L=Minneapolis,ST=Minnesota,C=US"
            },
            "type": "clientConnection"
        }
    ]
}
```

The response, for example the JSON response above, provides client server 102 with the information to connect to the appropriate destination (e.g., first application server cluster 108 or second application server cluster 112). The "channel" (i.e., "CHANNEL1") identifies the relevant information used by client server 102 to connect to the appropriate destination server. The data in "channel" defines the "host" (i.e., "host1.example.com") and the "port" (i.e., 2222) to which client server 102 connections. The data in "channel" further defines a "queueManager" (i.e., "MANAGER1") and "transmissionSecurity" protocols to be used for the connection. GSLB 116 provides this information to client server 102 in response to first DNS message 124. GSLB 116 optimizes the DNS response, as described above, to identify a server, server cluster, and/or data center that is closest to the client server 102. The closest server, server cluster, and/or data center may be identified as a primary pool (e.g., first data center 104). The next closest server, server cluster, and/or data center may be identified as a secondary pool (e.g., second data center 106) for disaster recover scenarios. However, GSLB 116 may provide connection information for the primary pool in response to DNS request 124 from client server 102.

Client server 102 then sends the digital messages to first MQ message 130 to store and forward to the destination server (e.g., one of first application server cluster 108 and second application server cluster 112). The connection used to send first MQ message 130 to first MQ server 110 is defined above as the "channel." First MQ server 110 receives first MQ message 130 and sends a second MQ message 132 to first application server cluster 108 to process the digital messages sent by client server 102. In various embodiments, this may include replicating the digital messages to each of the application servers in first application server cluster 108.

Figure 1B:
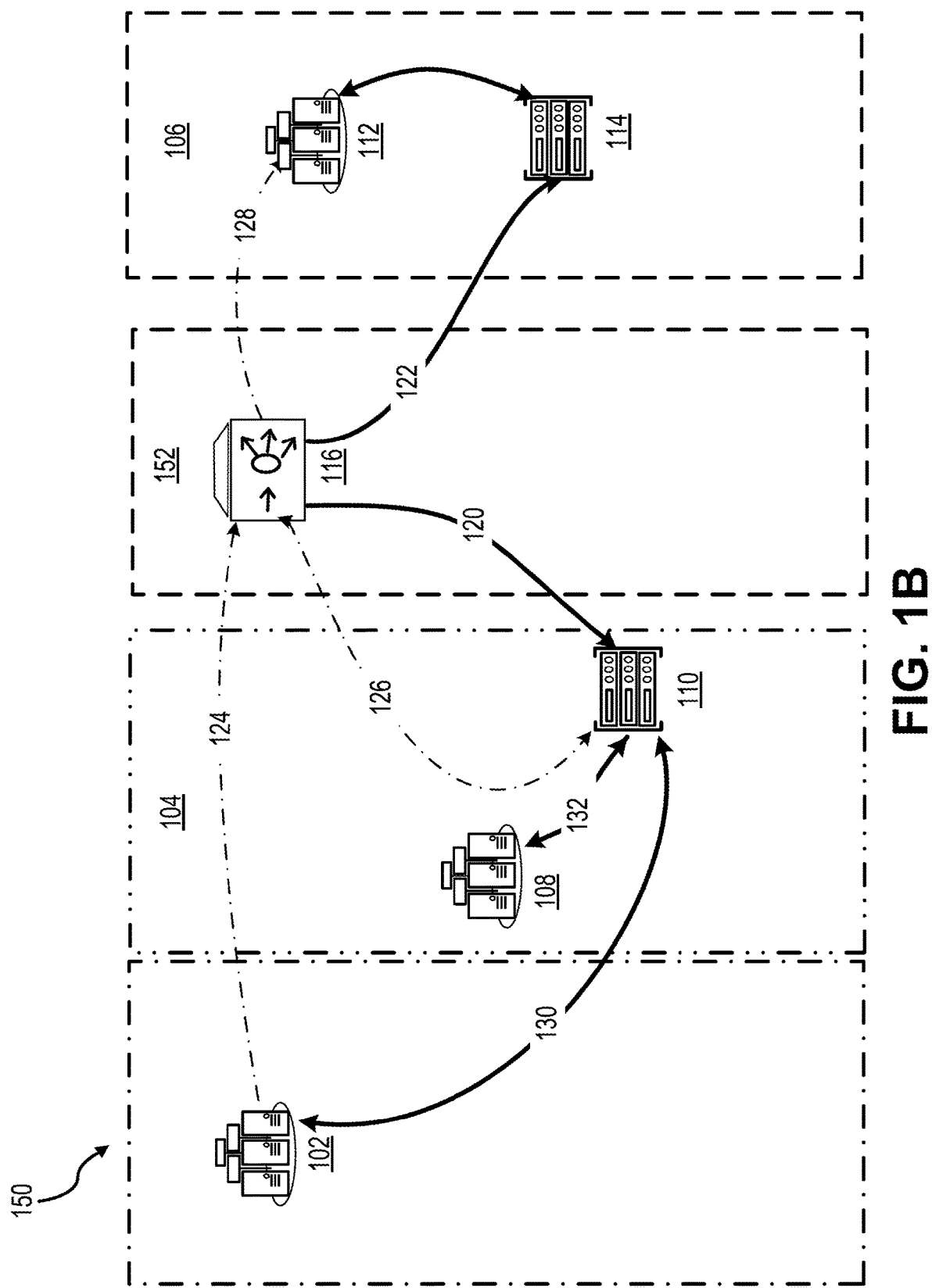

Referring now to FIG. 1B, a system 150 is illustrated in accordance with various embodiments. System 150 includes similar components to system 100 described above in FIG. 1A including client server 102, first data center 104, second data center 106, first application server cluster 108, first MQ server 110, second application server cluster 112, second MQ server 114, and global server load balancer (GSLB) 116, descriptions of which will not be repeated. System 150 further includes a third data center 152 that houses GLSB 116. From third data center 152, GSLB 116 monitors and communicates with first application server cluster 108, first MQ server 110, second application server cluster 112, and second MQ server 114. In various embodiments, third data center 152 may be in a geographic location that is central to both first data center 104 and second data center 106. In various embodiments, first data center 104 and/or second data center 106 may each further house a global server load balancer for redundancy and backup.

Figure 2A:
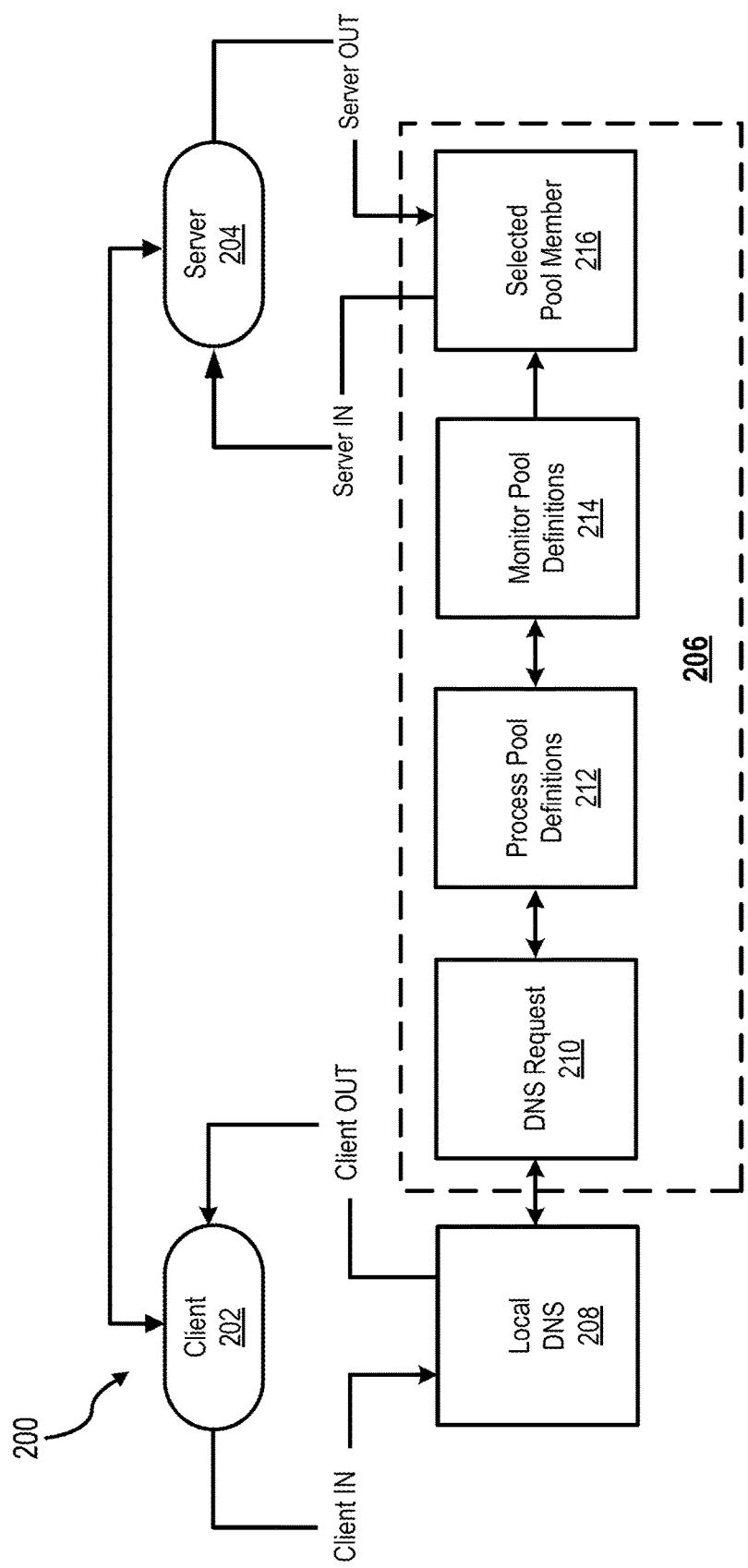
FIGS. 2A, 2B, and 2C illustrate exemplary flow diagrams for global traffic management in high availability message queueing systems, in accordance with various embodiments.
Figure 2B:
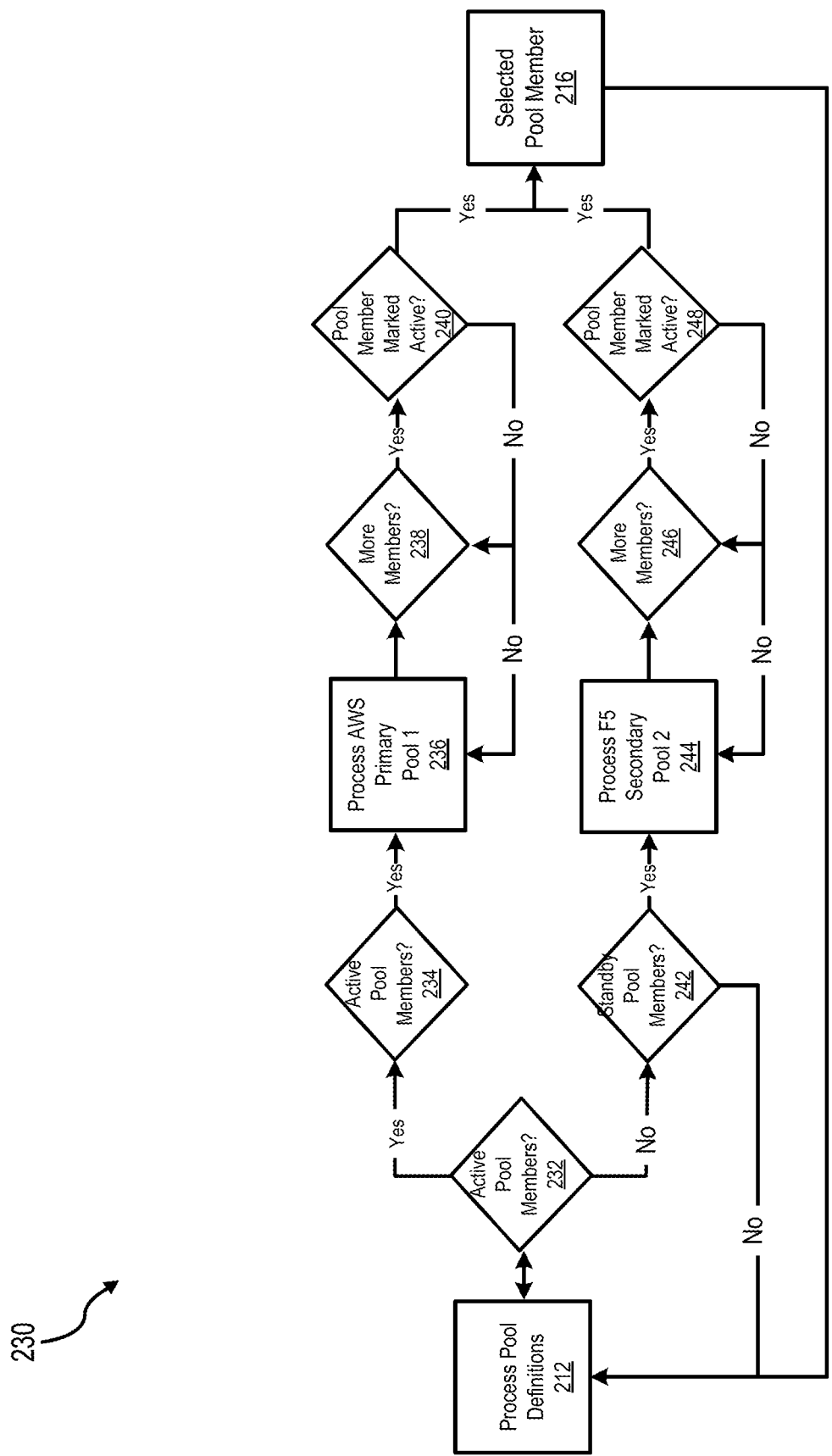
Figure 2C:
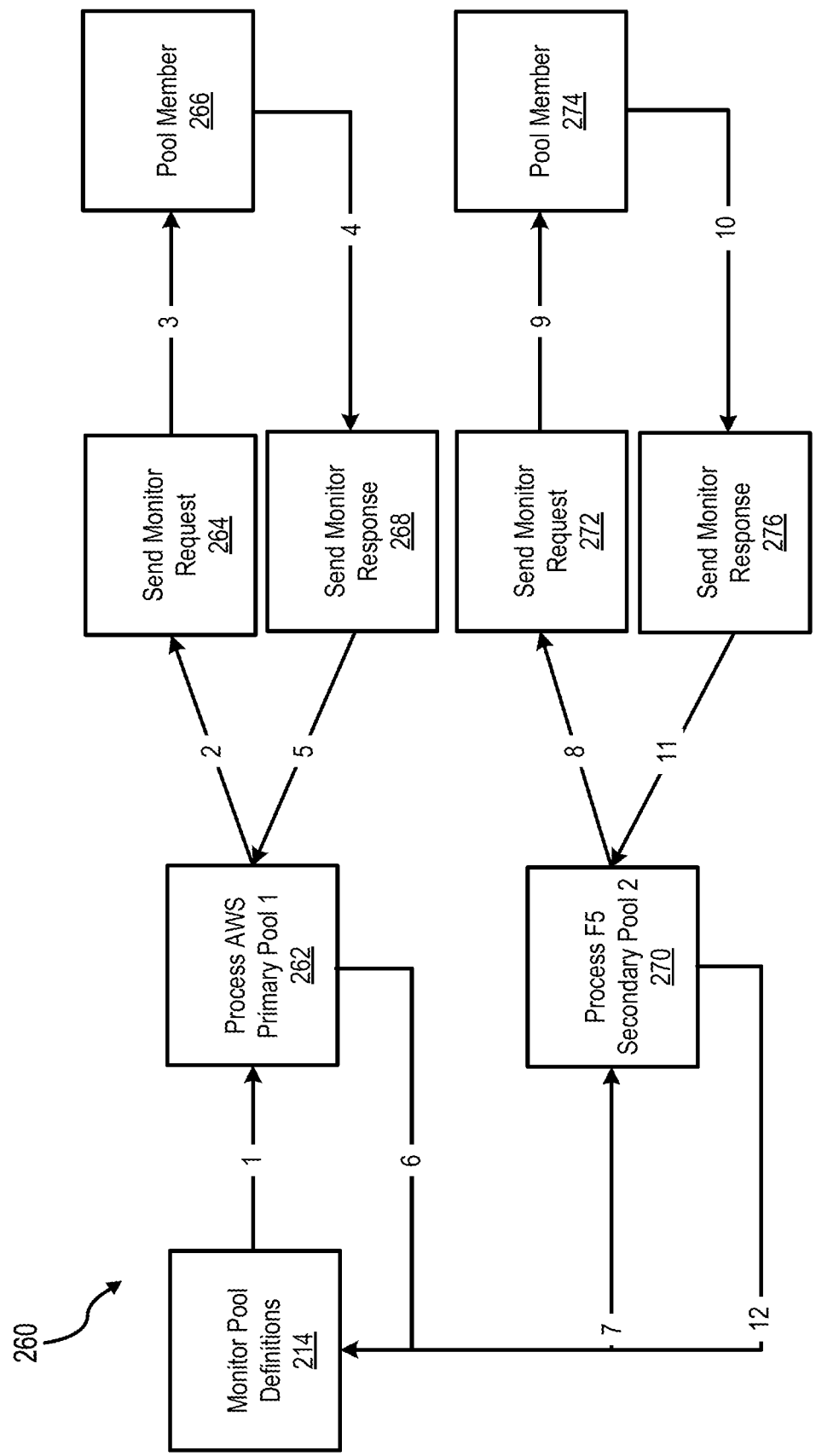

Referring now to FIGS. 2A-2C flow diagrams 200, 230, and 260 of processing of a global server load balancer (e.g., GSLB 116) are illustrated, in accordance with various embodiments. Referring first to FIG. 2A, flow diagram 200 illustrates an exemplary flow diagram of a domain name service (DNS) request from a client 202 for a server 204 using a GSLB 206. GSLB may be an example of GSLB 116, client 202 may be an example of client server 102, and server 204 may be an example of an application server in first application server cluster 108 or second application server cluster 112 described above in FIG. 1. Client 202 is configured to send a digital message to server 204 and sends a request for a uniform resource locator (URL) to a local DNS server 208. Local DNS server 208 forwards the DNS request to GSLB 206. GSLB 206 receives the DNS request at block 210, processes pool definitions at block 212, monitors pool definitions at block 214, and selects a pool member at block 216 that identifies server 204 and returns the selected pool member to client 202. Processing pool definitions at block 212 identifies all devices (e.g., 4-6 individual servers of an application server cluster) that are configured in GSLB 206 to process the digital message to be sent by client 202. Monitor pool definitions at block 214 verifies whether at least one pool member is available. In various embodiments, monitoring pool definitions may include GSLB 206 determining an operational status of each pool member as described above in FIG. 1. Selected pool member at block 216, GSLB 206 selects a pool member if at least one pool member is available. GSLB 206 responds to client 202 with information to connect to a pool member that is the closest and/or has the least amount of traffic and/or is the next pool member in line to process a received message. Client 202 uses the information provided by GSLB 206 to connect directly to server 204 and to communicate directly with server 204. As such, GSLB 206 serves a dual role as a DNS server and a status monitor of the different pool members.

Referring now to FIG. 2B, flow diagram 230 illustrates the steps performed by GTM 206 at block 212, process pool definitions. At block 232, GTM 206 determines whether there are any active pool members (e.g., in first application server cluster 108). If it is determined that there are active pool members, the process proceeds to block 234 where GTM 206 verifies the active pool members and proceeds to block 236. At block 236, GTM 206 processes the pool members of a primary pool (e.g., an AWS pool, first application server cluster 108, etc.). At block 238, GTM 206 determines whether there are more active pool members in the primary pool. At block 240, if there are active pool members, GTM 206 selects an active pool member at block 216. If at either block 238 or block 240 there are no more pool members or no active pool members, the process returns to process the primary pool and then to the standby pool at block 242. At block 242, GTM 206 determines whether there are any standby pool members (e.g., in second application server cluster 112). If there are standby pool members, the process proceeds to block 244 where GTM 206 processes standby pool members similar to the primary pool members. At block 246, GTM 206 checks whether there are more pool members and whether they are active. GTM 206 then selects from the additional active pool members in the standby pool at block 216.

Referring now to FIG. 2C, flow diagram 260 illustrates the steps performed by GTM 206 at block 214 to monitor pool definitions. At block 262, GTM 206 sends a status request to the primary pool (e.g., AWS, first application server cluster 108, etc.) to determine whether the primary pool is active. At block 264, the primary pool sends a monitor request to each pool member in the primary pool. At block 266, each pool member in the primary pool receives the status request. At block 268, each pool member in the primary pool sends a status response to the primary pool. At block 262, the primary pool sends a status response to GTM 206 indicating whether the primary pool is active or not based on the status responses from each pool member in the primary pool. If it is determined that the primary pool is not active based on the monitor status response, GTM 206 sends a status request to the secondary pool (e.g., Kyndryl, second application server cluster 112, etc.) to determine whether the secondary pool is active. At block 272, the secondary pool sends a monitor request to each pool member in the secondary pool. At block 274, each pool member in the secondary pool receives the status request. At block 276, each pool member in the secondary pool sends a status response to the secondary pool. At block 270, the secondary pool sends a status response to GTM 206 indicating whether the secondary pool is active or not based on the status responses from each pool member in the secondary pool. In various embodiments, the status requests may be sent about every 10 seconds to about every 5 minutes, and more specifically, about every minute. In various embodiments, the time between each status message may be shorter or longer.

Figure 3A:
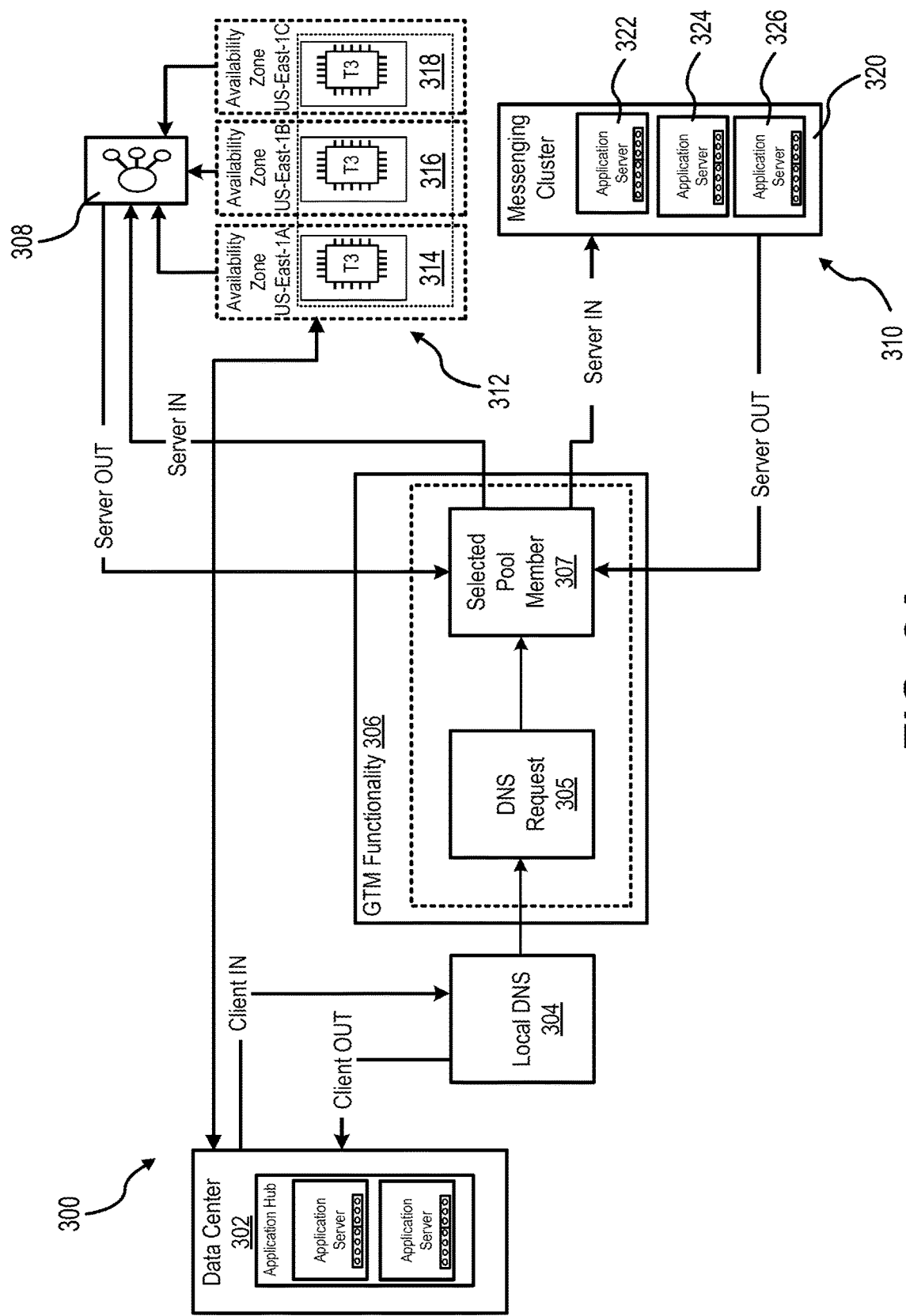
FIGS. 3A and 3B illustrate an exemplary high availability system including message clusters for continuous data replication, in accordance with various embodiments.

Referring now to FIG. 3A, a system 300 for a message cluster with high availability is illustrated, in accordance with various embodiments. System 300 may include similar components to those described herein in system 100 and flow diagram 200 in FIGS. 1 and 2A-2C. System 300 may include, for example, a client server 302, a local DNS 304, a global server load balancer (GSLB) 306, a first data center 308, a second data center 310, a DNS request block 305, and a selected pool member block 307. Descriptions of each component may not be repeated below. System 300 may further include a first messaging cluster 312, a first primary pool member 314, a second primary pool member 316, a third primary pool member 318, a second messaging cluster 320, a first secondary pool member 322, a second secondary pool member 324, and a third secondary pool member 326. First data center 308 may include first messaging cluster 312, first primary pool member 314, second primary pool member 316, third primary pool member 318. Second data center 310 may include second messaging cluster 320, first secondary pool member 322, second secondary pool member 324, and third secondary pool member 326.

As described herein, in various embodiments, GSLB 306 may select a pool member from the primary pool or the secondary pool in response to a DNS request from client server 302. In the illustrated embodiments, the primary pool is a first messaging cluster 312 and the pool members are first primary pool member 314, second primary pool member 316, third primary pool member 318. The secondary pool is a second messaging cluster 320 and the pool members are first secondary pool member 322, second secondary pool member 324, and third secondary pool member 326. Client server 302 communicates with first messaging cluster 312 or second messaging cluster 320 in response to a DNS query to GSLB 306.

Figure 3B:
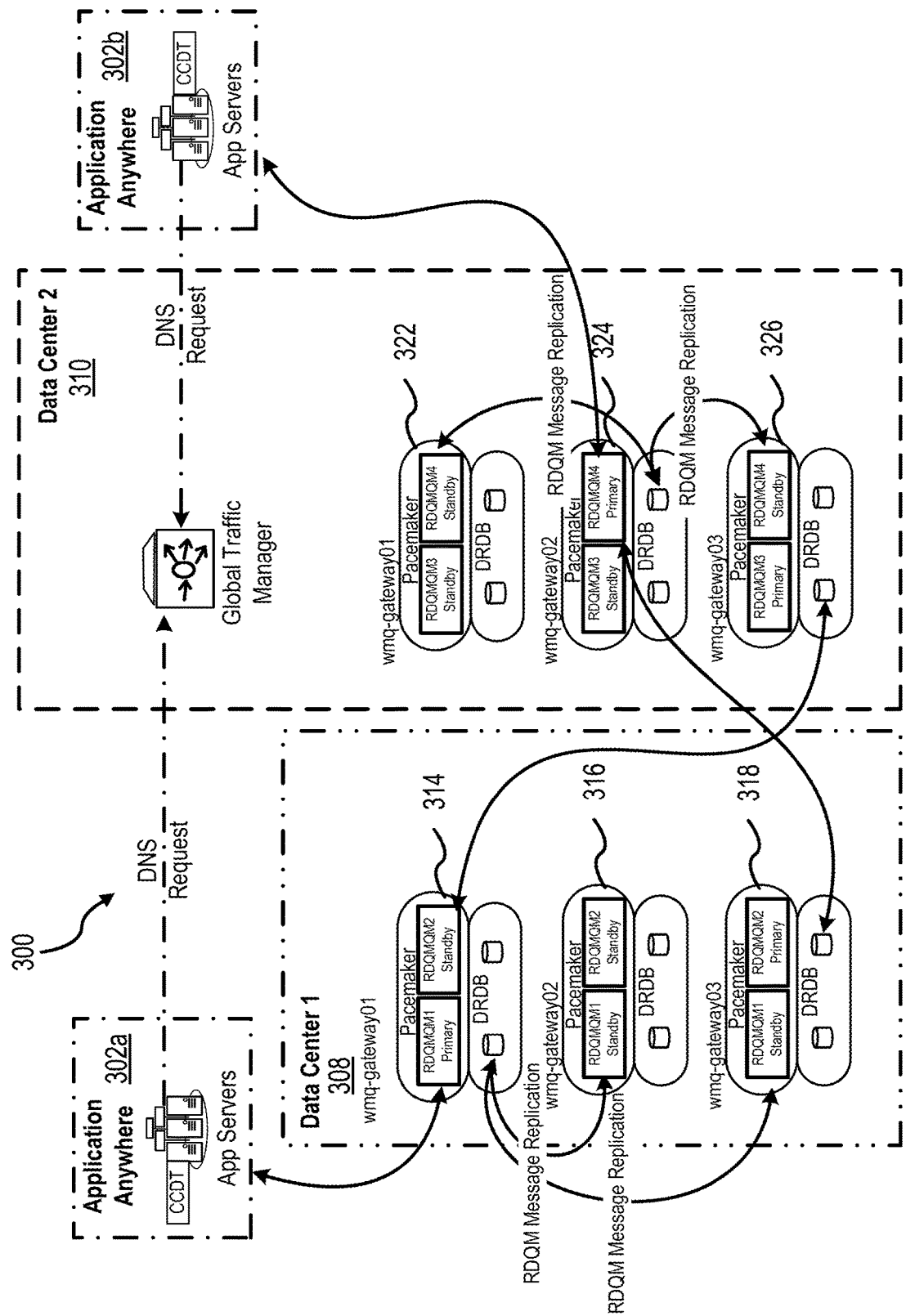

Referring now to FIG. 3B, system 300 is illustrated which replicates the digital messages received from client server 302 to each pool member, in accordance with various embodiments. FIG. 3B illustrates a first client server 302a and a second client server 302b that is in a different geographic location than first client server 302a. FIG. 3B further illustrates GSLB 306 as being located in second data center 310. In various embodiments, GSLB 306 may be located in first data center 308. In various embodiments, GSLB 306 may be located in a third data center (e.g., third data center 152 described in FIG. 1). In various embodiments, the third data center may be in a different geographic location than first data center 308 and second data center 310. Regardless of physical location, GSLB 306 performs the DNS tasks and availability monitoring previously described. As such, in response to first client server 302a receiving a DNS response from GSLB 306 indicating that first data center 308 being used and second client server 302b may receive a DNS response from GSLB 306 indicating that second data center 310 is being used. Each DNS response further indicates which pool member in the respective data center to use. The selected pool member may be identified as the primary server for processing the digital messages.

As illustrated in FIG. 3B, in various embodiments, first client server 302a communicates with first primary pool member 314 as the primary server, and sends the digital messages to be processed by first primary pool member 314. That is, first client server 302a performs a put operation to send the digital messages to first primary pool member 314. First primary pool member 314 stores the received digital messages and replicates the received digital messages to second primary pool member 316 and third primary pool member 318 to be stored. Second primary pool member 316 and third primary pool member 318 act as standby servers for processing the digital messages. First primary pool member 314 then responds to first client server 302a. At this point, the received digital messages are replicated within the pool members of first data center 308. This replication ensures that the digital messages are seamlessly available to first client server 302a should a failure occur (e.g., client connection failure, primary pool member failure, etc.). In various embodiments, the replication occurs continuously between first primary pool member 314, second primary pool member 316, and third primary pool member 318 while applications (e.g., first client server 302a) without adversely affecting the ability of the applications to use and/or modify the digital messages.

In various embodiments, each primary pool member 314, 316, 318 may include one or more volumes (e.g., 8 volumes each) where each volume of the one or more volumes corresponds to a separate queue manager (e.g., 8 queue managers). For example, primary pool members 314, 316, 318 may include 8 queue managers that each manage a volume on primary pool members 314, 316, 318 resulting in 24 total volumes total. In various embodiments, each primary pool member 314, 316, 318 may further include a separate network interface to each volume (e.g., 8 network interfaces per primary pool member) to facilitate the synchronous replication of data between primary pool members 314, 316, 318. First client server 302a may communicate with first primary pool member 314 (i.e., the active primary pool member) using the active interfaces (e.g., 8 network interfaces). In various embodiments, the network interfaces of the standby servers (i.e., second primary pool member 314 and third primary pool member 316) may remain inactive and inaccessible to first client server 302a. The network interfaces of one of the standby servers (e.g., second primary pool member 314) may become active in response to first client server 302a being instructed to communicate with one of the standby servers (e.g., the active server is offline). Replicating the received messages across the primary pool members 314, 316, 318 allows for a seamless transition between pool members.

First messaging cluster 312 further streams, or replicates, the received digital messages to second messaging cluster 320. In various embodiments, second messaging cluster 320 stores the streamed digital messages on an expiry cycle for disaster recover at a later time. In other words, the streamed digital messages may expire after a given time period to optimize available storage space and disaster recovery time periods. In various embodiments, the received digital messages are stored in a primary queue manager of second messaging cluster 320 thereby allowing playback of the received digital messages in a disaster recovery scenario. In various embodiments, second messaging cluster 320 may receive instructions to replay some or all of the received messages. In various embodiments, the received digital messages are replicated to first secondary pool member 322, second secondary pool member 324, and third secondary pool member 326. Replicating the received digital messages may provide seamless access to the received digital messages in a disaster recovery scenario (e.g., failure of first messaging cluster 312).

Similarly, in various embodiments, second client server 302b communicates with second secondary pool member 324, acting as the primary server, and sends the digital messages to be processed by second secondary pool member 324. Second secondary pool member 324 replicates the received digital messages to first secondary pool member 322 and third secondary pool member 326 where first secondary pool member 322 and third secondary pool member 326 act as standby servers for processing the digital messages. Second messaging cluster 320 further streams, or replicates, the received digital messages to first messaging cluster 312. In various embodiments, the received digital messages are replicated to first primary pool member 314, second primary pool member 316, and third primary pool member 318.

Generally, replicating the digital messages across the pool members of first messaging cluster 312 provides sufficient failover redundancy to support first client server 302a. Similarly, replicating the digital messages across the pool members of second messaging cluster 320 generally provides sufficient failover redundancy to support second client server 302b. However, in some instances first data center 308, including first messaging cluster 312, may be taken offline by a power outage, a natural disaster, a network hack, or other such event. In such instances, a disaster recovery protocol may be implemented that includes directing traffic from first client server 302a, for example, to second data center 310 and the pool members of second message cluster 320. Second message cluster 320 is able to continue processing the received digital messages for first client server 302a as the digital messages have been communicated to second message cluster 320 either synchronously or asynchronously to facilitate a total switch over.

Figure 4:
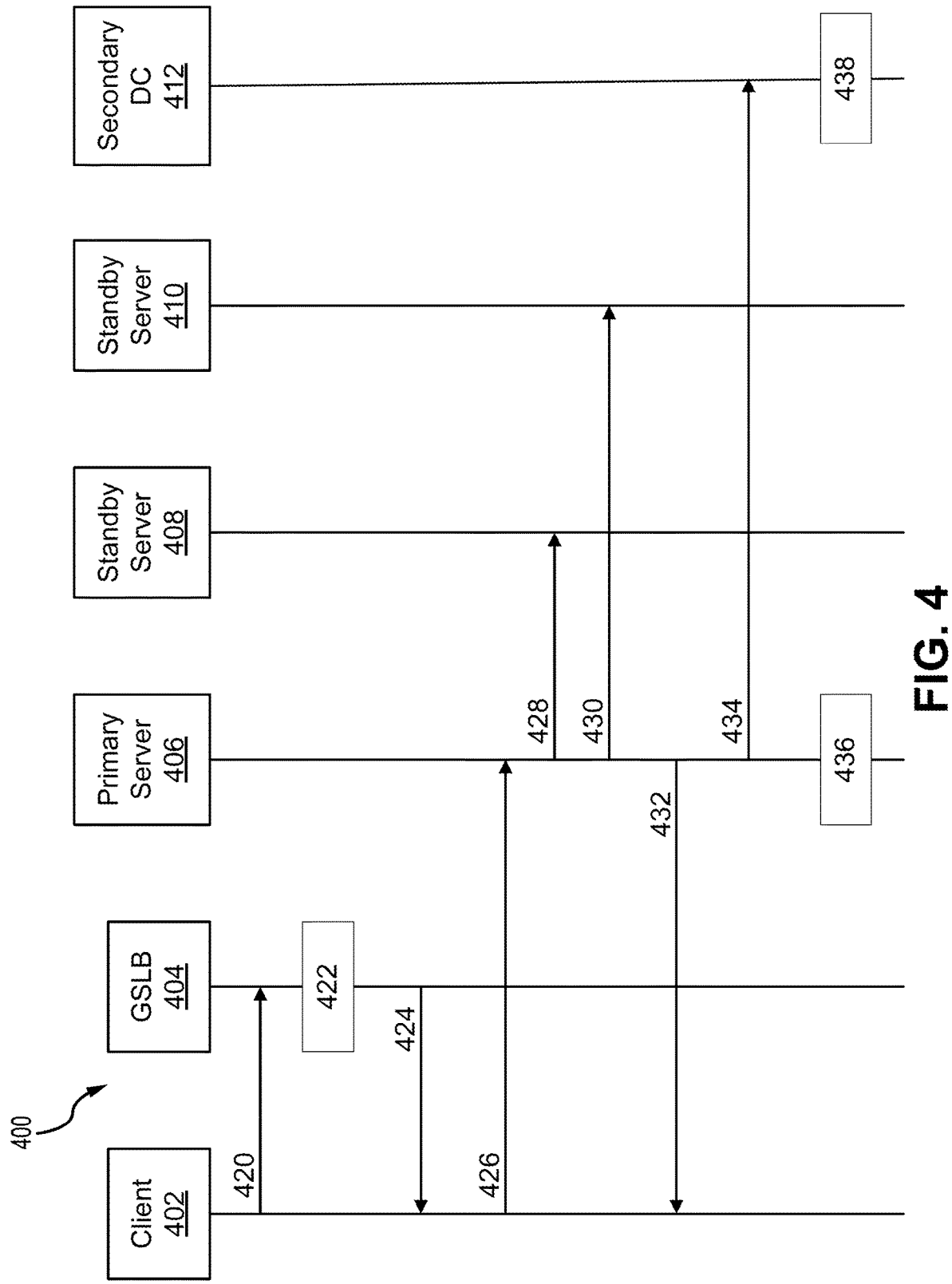
FIG. 4 illustrates an exemplary flow diagram of storing and replicating digital messages in a message cluster, in accordance with various embodiments.

Referring now to FIG. 4, a flow diagram 400 of message replication within system 300 is illustrated, in accordance with various embodiments. Flow diagram 400 includes a client 402, a global server load balancer (GSLB) 404, a primary server 406, a first standby server 408, a second standby server 410, and a secondary data center 412. In various embodiments, client 402 may be an example of client server 302, first client server 302a, and/or second client server 302b described above in FIGS. 3A and 3B. In various embodiments, GSLB 404 may be an example of GSLB 306 described in FIGS. 3A and 3B and GSLB 116 described above in FIG. 1. In various embodiments, primary server 406, first standby server 408, and second standby server 410 may be examples of first primary pool member 314, a second primary pool member 316, a third primary pool member 318 or first secondary pool member 322, a second secondary pool member 324, a third secondary pool member 326 described above in FIGS. 3A and 3B. Furthermore, in various embodiments, primary server 406, first standby server 408, and second standby server 410 may be located in a first data center (e.g., first data center 308 or second data center 310). In various embodiments, secondary data center 412 may be an example of first data center 308 or second data center 310 described above in FIG. 3A or 3B.

Client 402 transmits to GSLB 404 a request 420 for domain name service (DNS) request for a primary server to send one or more digital messages. In various embodiments, GSLB 404 may be located in the first data center. In various embodiments, GSLB 404 may be located in secondary data center 412. In various embodiments, GSLB 404 may not be located in either first or second data center.

At block 422, GSLB 404 identifies a server, or a pool member, as the primary server. In various embodiments, GSLB 404 may identified the primary server as described above in FIGS. 2A-2C. In various embodiments, GSLB 404 identify the primary server based at least in part on geographical proximity to client 402. In various embodiments, GSLB 404 may use a round robin scheme to identify a primary server from a pool of servers in the same location.

GSLB 404 sends to client 402 a response 424 identifying the primary server and information to communicate with the primary server. In various embodiments, response 424 may be in transmitted in a JSON format, as previously described.

Client 402 transmits to primary server 406 a put request 426 including the one or more digital messages for processing. Primary server 406 stores the one or more digital messages for processing. In various embodiments, primary server 406 stores the one or more digital messages in a database.

Primary server 406 sends to first standby server 408 a first replicate message 428 to store the one or more digital messages on first standby server 408. Primary server 406 sends to second standby server 410 a second replicate message 430 to store the one or more digital messages on second standby server 410. The synchronous replication of the one or more digital messages to standby servers 408, 410 provides redundancy and data security in the event that primary server 406 goes offline.

Primary server 406 response to client 402 with a response 432 after replicating the one or more digital messages. Response 432 indicates to client 402 that the one or more digital messages were received and are in line for processing.

In various embodiments, future requests from client 402 may be send to primary server 406 or to either of first standby server 408 or second standby server 410. The synchronous replication of the one or more digital messages allows any of servers 406, 408, 410 to handle requests from client 402 or other clients based on capacity and server status.

Primary server 406 sends to secondary data center 412 a stream queue 434 including the one or more digital messages received in put 426. In various embodiments, stream queue 434 may be sent asynchronously (i.e., after response 432). In various embodiments, stream queue 434 may be sent synchronously (i.e., before response 432). In various embodiments, stream queue 434 may including one or more digital messages previously received from client 402 and/or other clients.

At block 436, primary server 406 processes the one or more digital messages. In various embodiments, primary server 406 may send the one or more messages to another server for processing (e.g., first application server cluster 108). In various embodiments, primary server 406 may process the one or more digital messages.

At block 438, secondary data center 412 replicates the one or more digital messages to located in secondary data center 412. This provides full redundancy of all digital messages across multiple servers and data centers for fail over reliability and disaster recovery scenarios. Replicating the one or more digital messages across the servers of secondary data center 412 may occur in the same way as described above with respect to primary server 406 and standby servers 408, 410. In various embodiments, one of the servers in secondary data center 412 may respond to primary server 406 indicating successful replication of the one or more digital messages. The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

The process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements, but also to the various system components as described herein. It should be understood that, although exemplary embodiments are illustrated in the figures and described herein, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

Computer programs (also referred to as computer control logic) are stored in main memory and/or secondary memory. Computer programs may also be received via communications interface. Such computer programs, in response to being executed, enable the computer system to perform the features as discussed herein. In particular, the computer programs, in response to being executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the server may include application servers (e.g., WEBSPHERE®, WEBLOGIC®, JBOSS®, POSTGRES PLUS ADVANCED SERVER®, etc.). In various embodiments, the server may include web servers (e.g., Apache, IIS, GOOGLE® Web Server, SUN JAVA® System Web Server, JAVA® Virtual Machine running on LINUX® or WINDOWS® operating systems).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various support software and drivers typically associated with computers. The web-client may also run MICROSOFT® INTERNET EXPLORER® software, MOZILLA® FIREFOX® software, GOOGLE CHROME™ software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

The various system components may be independently, separately, or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods. It is noted that the network may be implemented as other types of networks, such as an interactive television (ITV) network. Moreover, the system contemplates the use, sale, or distribution of any goods, services, or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol. Transactions originating at a web client may pass through a firewall in order to prevent unauthorized access from users of other networks. Further, additional firewalls may be deployed between the varying components of CMS to further enhance security.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic curve cryptography (e.g., ECC, ECDH, ECDSA, etc.), and/or other post-quantum cryptography algorithms under development.

The firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the internet. A firewall may be integrated as software within an internet server or any other application server components, reside within another computing device, or take the form of a standalone hardware component.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g., IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet may be contemplated.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through various data association techniques. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with various embodiments, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions, such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data, but instead the appropriate action may be taken by providing to the user, at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The data may be big data that is processed by a distributed computing cluster. The distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A system, comprising:
a first messaging cluster in a first data center, the first data center being located in a first geographic location;
a second messaging cluster in a second data center, the second data center being located in a second geographic location;
a client server being located in a third geographic location;
a global server load balancer including a processor; and
a memory operatively coupled to the processor, the memory comprising instructions stored thereon that, in response to being executed by the processor, cause the processor to:
monitor a first status of the first messaging cluster in the first data center;
monitor a second status of the second messaging cluster in the second data center;
receive a first request from the client server, the first request being for a first destination to send data for processing;
identify the first messaging cluster as the first destination based on the first status being available and the third geographic location;
respond to the first request with a first connection information for the first messaging cluster;
receive a second request from the client server, the second request being for a second destination to send the data for processing;
identify the second messaging cluster as the second destination based on the first status being unavailable and the second status being available; and
respond to the second request with a second connection information for the second messaging cluster.

2. The system of claim 1, wherein the instructions in response to being executed by the processor, further cause the processor to identify the first messaging cluster based on a first distance being less than a second distance, the first distance being between the first geographic location and the third geographic location and the second distance being between the second geographic location and the third geographic location.

3. The system of claim 1, wherein the first messaging cluster includes a first plurality of messaging servers, and
wherein the instructions in response to being executed by the processor, further cause the processor to:
monitor a status of each of the first plurality of messaging servers; and
identify a first server of the first plurality of messaging servers as the first destination.

4. The system of claim 3, wherein the first status is available in response to at least one of the first plurality of messaging servers being available.

5. The system of claim 1, wherein the second messaging cluster includes a second plurality of messaging servers, and
wherein the instructions in response to being executed by the processor, further cause the processor to:
monitor a status of each of the second plurality of messaging servers; and
identify a first server of the second plurality of messaging servers as the second destination.

6. The system of claim 5, wherein the second status is available in response to at least one of the second plurality of messaging servers being available.

7. The system of claim 1, wherein the first messaging cluster is configured to receive the data for processing and replicate the data for processing to each of a first plurality of servers in the first messaging cluster.

8. The system of claim 7, wherein the first messaging cluster is further configured to stream the data for processing to the second messaging cluster, and wherein the second messaging cluster is configured to replicate the data and store the data for processing by the second messaging cluster.

9. The system of claim 1, wherein the identify the first messaging cluster as the first destination further includes identifying a first server of plurality of servers in the first messaging cluster as the first destination.

10. A method, comprising:
receiving, by a processor in a first messaging cluster, a first request to process a first data from a first server in a second messaging cluster;
storing, by the processor, the first data in a persistent memory for processing;

sending, by the processor, a second request to a standby server in the first messaging cluster to store the first data on the standby server;

receiving, by the processor, a first response from the standby server indicating that the first data is stored;

sending, by the processor, a second response to the first server in the second messaging cluster after receiving the first response, the second response indicating that the first data is replicated in the first messaging cluster;

receiving, by the processor, a third request to process the first data in response to the second messaging cluster being offline; and processing, by the processor, the first data in response to the third request.

11. The method of claim 10, further comprising:

receiving, by the processor, a fourth request to process a second data from a client server; and sending, by the processor, a third response to the client server indicating that the second data is stored.

12. The method of claim 11, further comprising sending, by the processor, the second data to the standby server to be stored before sending the third response.

13. The method of claim 11, further comprising sending, by the processor, the second data to the second messaging cluster to be stored on the second messaging cluster.

* * * * *